United States Patent
Niderberg et al.

(10) Patent No.: US 10,685,406 B1
(45) Date of Patent: Jun. 16, 2020

(54) SYSTEMS AND METHODS FOR PROVIDING CONTEXT TO CUSTOMER ACTIVITY THROUGH A VISUAL REPRESENTATION

(71) Applicants: Alex Niderberg, Arlington, VA (US); Colin Hart, Arlington, VA (US); Ryan Webb, Arlington, VA (US); Michael Chermside, Ardmore, PA (US)

(72) Inventors: Alex Niderberg, Arlington, VA (US); Colin Hart, Arlington, VA (US); Ryan Webb, Arlington, VA (US); Michael Chermside, Ardmore, PA (US)

(73) Assignee: Capital One Services, LLC, McLean, VA (US)

( * ) Notice: Subject to any disclaimer, the term of this patent is extended or adjusted under 35 U.S.C. 154(b) by 352 days.

(21) Appl. No.: 14/632,294

(22) Filed: Feb. 26, 2015

Related U.S. Application Data

(60) Provisional application No. 61/944,837, filed on Feb. 26, 2014.

(51) Int. Cl.
| | |
|---|---|
| *G06Q 40/00* | (2012.01) |
| *G06Q 20/32* | (2012.01) |
| *H04W 4/021* | (2018.01) |
| *G06Q 30/02* | (2012.01) |

(52) U.S. Cl.
CPC .......... *G06Q 40/12* (2013.12); *G06Q 20/322* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 7,232,064 B1* | 6/2007 | Toohey | .................. | G06Q 30/04 |
| | | | | 235/384 |
| 8,571,985 B1* | 10/2013 | Grigg | .................... | G06Q 40/02 |
| | | | | 705/35 |
| 2003/0061132 A1* | 3/2003 | Yu, Sr. | .................. | G06Q 30/02 |
| | | | | 705/30 |
| 2009/0109302 A1* | 4/2009 | Naruto | .................. | H04N 5/232 |
| | | | | 348/231.5 |
| 2010/0057502 A1* | 3/2010 | Arguelles | ............... | G06Q 10/02 |
| | | | | 705/5 |
| 2010/0268673 A1 | 10/2010 | Quadracci | | |
| 2011/0172836 A1 | 7/2011 | Boss et al. | | |
| 2012/0094639 A1* | 4/2012 | Carlson | ................. | H04W 4/028 |
| | | | | 455/414.1 |
| 2012/0230577 A1* | 9/2012 | Calman | ................ | G06Q 20/042 |
| | | | | 382/138 |

(Continued)

*Primary Examiner* — Garcia Ade
(74) *Attorney, Agent, or Firm* — Finnegan, Henderson, Farabow, Garrett & Dunner, LLP

(57) ABSTRACT

A system and method provide context to customer activity through a visual representation. In one implementation, a system may include one or more memory devices storing instructions. The system may also include one or more processors configured to execute the instructions to receive transaction data associated with a customer, and receive a request to generate a visual representation of a trip taken by the customer. The one or more processors may also be configured to determine transactions associated with a trip taken by the customer based on at least the transaction data, and generate a visual representation of the trip, the visual representation including the transactions.

22 Claims, 6 Drawing Sheets

(56) References Cited

U.S. PATENT DOCUMENTS

| | | | |
|---|---|---|---|
| 2012/0259716 A1* | 10/2012 | Rosenberger | G06Q 40/12 |
| | | | 705/16 |
| 2013/0046635 A1 | 2/2013 | Grigg et al. | |
| 2015/0088704 A1* | 3/2015 | Votaw | G06Q 50/01 |
| | | | 705/30 |
| 2015/0120443 A1* | 4/2015 | Chan | G06Q 30/0255 |
| | | | 705/14.53 |
| 2015/0120564 A1* | 4/2015 | Smith | G06Q 20/042 |
| | | | 705/45 |

* cited by examiner

SYSTEMS AND METHODS FOR PROVIDING CONTEXT TO CUSTOMER ACTIVITY THROUGH A VISUAL REPRESENTATION

PRIORITY CLAIM

This application claims priority under 35 U.S.C. § 119 to U.S. Provisional Application No. 61/944,837, filed on Feb. 26, 2014, which is expressly incorporated herein by reference in its entirety.

TECHNICAL FIELD

The disclosed embodiments generally relate to systems and methods for providing context to customer activity, and more particularly, to systems and methods for providing context to customer activity through a visual representation.

BACKGROUND

Financial service providers generally allow customers to review their financial activity by viewing lists of transactions that were processed through one or more financial accounts. For example, customers may view bank statements that list automated transaction descriptions corresponding to various completed financial transactions. The information contained in the transaction descriptions may be useful for a variety of reasons. For example, the information may serve as a record of activity that the customer engaged in over a period of time. A record of financial activity may be valuable to the customer for financial reasons, such as when it is used to identify and prevent fraud, and for personal reasons, as the record may tell a story about an event, such as what the customer did while on vacation.

Current technology, however, may not allow a customer to easily and efficiently view financial activity in a meaningful way. For example, bank statements will often only list transaction descriptions by processing date, and in such a way that the corresponding transaction may not be easily identifiable by the customer. Therefore, a need exists for tools that use available data to allow customers to view and use their financial activity in a convenient and productive manner.

SUMMARY

Consistent with a disclosed embodiment, a system for providing a visual representation of customer activity is provided. The system may include one or more memory devices storing instructions. The system may also include one or more processors configured to execute the instructions to receive transaction data associated with a customer, and receive a request to generate a visual representation of a trip taken by the customer. The one or more processors may also be configured to and determine transactions associated with the trip based on at least the transaction data, and generate a visual representation of the trip, the visual representation including the transactions.

Consistent with another disclosed embodiment, a computer-implemented method for providing a visual representation of customer activity is provided. The method may include receiving transaction data associated with a customer, and determining, by one or more processors, transactions associated with a trip taken by the customer based on at least the transaction data. The method may also include categorizing, by the one or more processors, the transactions into sub-groups corresponding to stops made during the trip. The method may further include associating, by the one or more processors, at least one image with the transaction data, and generating, by the one or more processors, a visual representation of the trip, the visual representation identifying the trip, each stop on the trip, and each of transactions and including the at least one associated image.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Disclosed embodiments provide systems and methods for providing a visual representation of customer activity. In some embodiments, the visual representation may be related to a particular subset of customer activity that is particularly applicable to a visual representation. For example, certain embodiments may focus on customer financial activity that occurs away from a customer's home area (e.g., when a customer is on a trip away from home, such as a vacation or business trip). It should be understood, however, that certain aspects disclosed herein are not limited to any particular customer activity.

Figure 1:
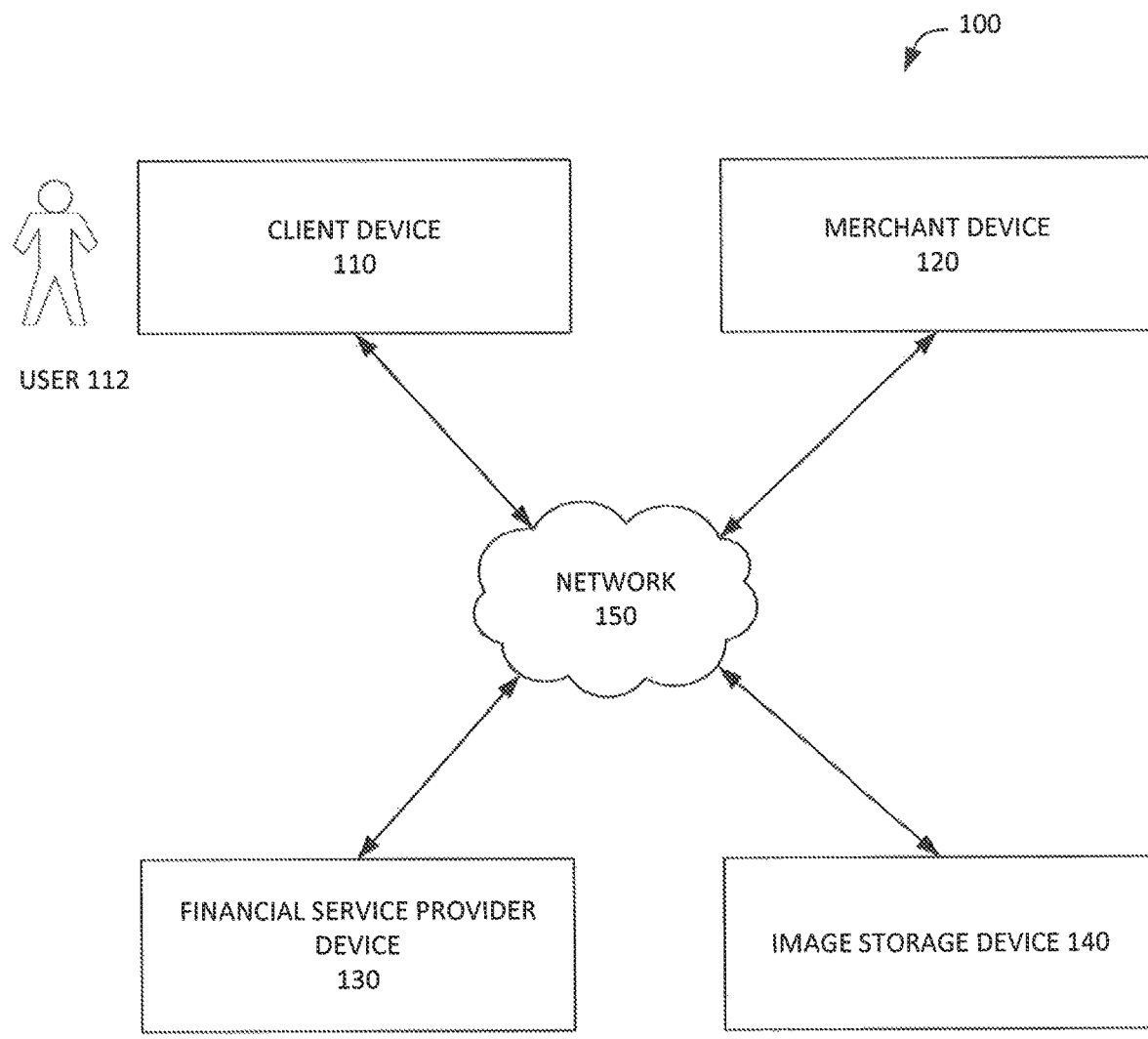
FIG. 1 is a block diagram of an exemplary system, consistent with disclosed embodiments.

FIG. 1 shows an exemplary system 100 that may be configured to perform one or more processes consistent with disclosed embodiments. In certain aspects, one or more components of system 100 may be configured to execute one or more software processes to provide one or more aspects of the disclosed embodiments. The components and arrangement shown in FIG. 1 is not intended to be limiting to the disclosed embodiment as the components used to implement the processes and features disclosed here may vary.

In accordance with disclosed embodiments, system 100 may include a client device 110, a merchant device 120, a financial service provider device 130, an image storage device 140, and a network 150. Other components known to one of ordinary skill in the art may additionally or alternatively be included in system 100 to process, transmit, provide, and receive information consistent with the disclosed embodiments.

Client device 110 may be one or more computer systems. For example, client device 110 may include a desktop computer, a laptop computer, a mobile device with computing ability (e.g., smart phone, tablet, etc.), a server, any combination of these computers and/or affiliated components, etc. In one embodiment, client device 110 may be a computer system or device that is operated by a user 112.

Client device 110 may be configured with memory devices that store one or more operating systems that perform known operating system functions when executed by one or more processors. By way of example, the operating systems may include Microsoft Windows™, Unix™, Linux™, Apple™ Computers type operating systems, mobile operating systems, such as Apple iOS™ or an Android™ operating system, Personal Digital Assistant (PDA) type operating systems, such as Microsoft CE™, or other types of operating systems. Accordingly, embodiments of the disclosed invention will operate and function with computer systems running any type of operating system. Client device 110 may also include memory devices storing communication software that, when executed by a processor, allows client device 110 to communicate with network 150, such as Web browser software, tablet, or smart hand held device networking software, etc. Client device 110 may be a device that executes mobile applications, such as a tablet or mobile device. In some embodiments, client device 110 may be configured to take and/or store images such as pictures taken with a camera.

Merchant device 120 may be one or more computer systems associated with a merchant or other third party. Merchant device 120 may include one or more computing systems that are configured to perform computer-implemented processes, such as a server, desktop, laptop, mobile device, etc. Merchant device 120 may be associated with an entity that transacts with customers. For example, the merchant may be an entity that provides goods and/or services (e.g., a retail store). While FIG. 1 shows one merchant device 120 in system 100, the disclosed embodiments may be implemented in a system involving a single merchant or multiple merchants (e.g., two or more merchants). In one embodiment, the merchant may include brick-and-mortar location(s) that a customer (e.g., user 112) may physically visit and purchase goods and services. Such physical locations may include computing devices that perform financial service transactions with consumers (e.g., POS terminal(s), kiosks, etc.). Merchant device 120 may be associated with a merchant who provides electronic shopping mechanisms, such as a website or a similar online location that consumers (e.g., user 112) may access using a computer (e.g., client device 110) through browser software, a mobile application, or similar software. Merchant device 120 may include computing devices that may include back and/or front-end computing components that process transactions and store consumer transaction data and execute software instructions to perform operations consistent with the disclosed embodiments, such as computers that are operated by employees of a merchant (e.g., back-office systems, etc.).

In accordance with certain aspects of the disclosed embodiments, one or more computing devices associated with merchant device 120 may be configured to store customer transaction data associated with the business conducted at the merchant. In some aspects, customers may make payments with payment cards (e.g., credit card, debit card, etc.) issued by a financial service provider for the goods/services provided by the merchant. In other aspects, consumers may make the payment by cash or other type of payment. In both situations, one or more computing devices associated with merchant device 120 may be configured to store the consumer transaction data and provide the data to a financial service provider, such as the financial service provider associated with the form of payment used by the consumer.

Financial service provider device 130 may be one or more computer systems associated with an entity that provides financial services. For example, the entity may be a bank, credit union, credit card issuer, or other type of financial service entity that generates, provides, manages, and/or maintains financial service accounts for one or more users. Financial service accounts may include, for example, credit card accounts, checking accounts, savings accounts, loan accounts, reward accounts, and any other types of financial service account known to those skilled in the art. Financial service accounts may be associated with physical financial service account cards, such as a credit or check card that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. Financial service provider device 130 may include infrastructure and components that are configured to generate and provide financial service accounts and financial service account cards (e.g., credit cards, check cards, etc.). Financial service provider device 130 may also include infrastructures and components that are configured to store transaction data associated with the financial service accounts. It should be understood, however, that financial service provider device 130 may be any device that stores and/or provides access to transaction data, and may not be directly associated with an entity that maintains financial service accounts.

Consistent with disclosed embodiments, financial service provider device 130 may be configured to provide customers with access to financial data reflecting personal purchasing activity via client device 110. For example, financial service provider device 130 may transmit financial transaction data to client device 110 for display to the customer.

Image storage device 140 may be one or more computer and/or storage systems configured to receive and store images, such as camera photographs, drawings, videos, or other captured and/or created pictures. In an exemplary embodiment, components of system 100 (e.g., client device 110) may be configured to access images and corresponding contextual information stored in image storage device(s) 140. For example, client device 110 may access images stored directly by client device 110 or a connected component, and/or images accessible via network 150.

In one example, image storage device 140 may include a device that stores images captured and/or created by user 112. For example, user 112 may operate a camera to capture an image, which image storage device 140 may store in a memory and/or database. In an exemplary embodiment, image storage device 140 may be a component of client device 110, such as a memory of a smart phone or tablet that has a built-in camera. User 112 may operate client device 110 to capture and/or create an image, which may be transmitted to and stored with image storage device 140.

In an exemplary embodiment, image storage device 140 may associate identifying contextual information with each image captured and/or created by user 112. For example, image storage device 140 may associate time and date information (e.g., time and/or date the image was captured/ created), geographic location information (e.g., city, state, country, zip code, latitude/longitude information, GPS coordinates, etc.) indicating a location at which the image was captured/created, and/or other identifying information (e.g., user-entered information such as image titles and/or descriptions, tags of people, places, and/or things in the image, etc.) with each stored image.

In another example, image storage device 140 may include a computer system, such as a server and/or other computing device, which stores one or more images that were not necessarily captured or created by user 112. For example, image storage device 140 may store an image or collection of images associated with various places (e.g., particular streets, cities, states, etc.), entities (e.g., merchants, attractions, brands, etc.), and/or a combination of these (e.g., particular merchant locations) that are publically available. In an exemplary embodiment, the image(s) may be stored and accessible via network 150, such as the Internet and/or one or more application program interfaces (APIs). Examples of collections of images that may be stored by one or more image storage devices 140 include those associated with Flickr™, Google Street View™, and/ or similar web-based image services. Image storage device 140 may associate identifying contextual information, such as information indicating what is depicted in the image (e.g., places, entities, people, things, etc.), with these images, also.

Network 150 may be any type of network that provides communications, exchanges information, and/or facilitates the exchange of information between client device 110, merchant device 120, financial service provider device 130, and/or image storage device 140. In one embodiment, network 150 may be the Internet, a Local Area Network, or other suitable connection(s) that enables system 100 to send and receive information between the components of system 100. In other embodiments, one or more components of system 100 may communicate directly through a dedicated communication link(s) (not shown), such as a link between client device 110 and financial service provider device 130.

Figure 2:
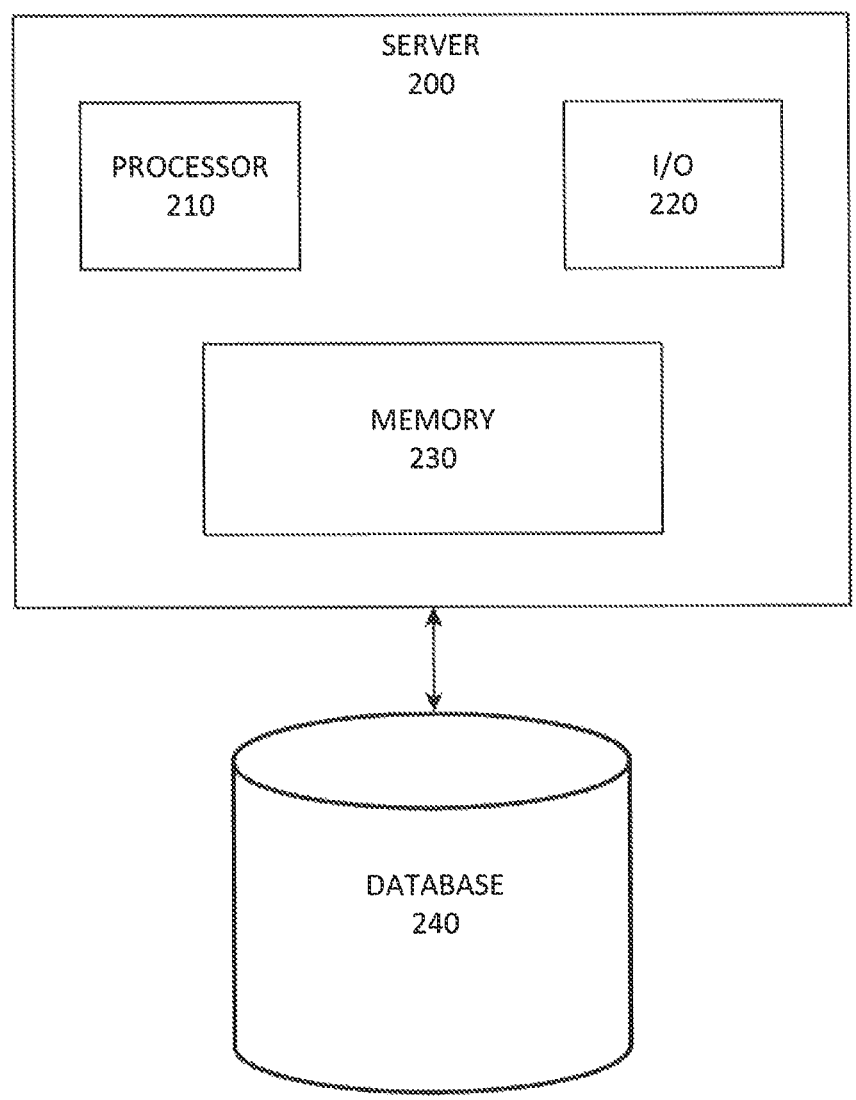
FIG. 2 is a block diagram of an exemplary server, consistent with disclosed embodiments.

FIG. 2 depicts a server 200, consistent with disclosed embodiments. In an exemplary embodiment, financial service provider device 130 may include server 200. It should be understood, however, that although server 200 may be depicted and described herein as a component of financial service provider device 130 for ease of discussion, server 200 or variations thereof may be used alternatively or additionally by client device 110, merchant device 120, and/or other components of system 100 (shown and not shown) to perform processes consistent with disclosed embodiments.

In one embodiment, server 200 may include one or more processors 210, one or more input/output (I/O) devices 220, and one or more memories 230. Server 200 may take the form of a mobile computing device, general purpose computer, a mainframe computer, or any combination of these components. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 150) or a dedicated network, such as a LAN.

Processor 210 may include one or more known processing devices, such as a microprocessor from the Pentium™ or Xeon™ family manufactured by Intelm, the Turion™ family manufactured by AMD™, or any of various processors manufactured by Sun Microsystems. The disclosed embodiments are not limited to any type of processor(s) configured in server 200.

I/O devices 220 may be one or more devices configured to allow data to be received and/or transmitted by server 200. I/O devices 220 may include one or more user I/O devices and/or components, such as those associated with a keyboard, mouse, touchscreen, display, etc. I/O devices 220 may also include one or more digital and/or analog communication devices that allow server 200 to communicate with other machines and devices, such as other components of system 100.

In some embodiments of server 200, such as in the case of client device 110 including one or more of the components depicted in FIG. 2, I/O devices 220 may include interface hardware configured to display one or more user interfaces. For example, the interface hardware may include a display screen (including touchscreens) that allow a user to view information and interact (e.g., provide input). It should be understood, that a user interface may "display" information through the interface hardware.

Memory 230 may include one or more storage devices configured to store instructions used by processor 210 to perform functions related to disclosed embodiments. For example, memory 230 may be configured with one or more software instructions associated with programs and/or data. Memory 230 may include a single program that performs the functions of the server 200, or multiple programs. Additionally, processor 210 may execute one or more programs located remotely from server 200. For example, client device 110, merchant device 120, financial service provider device 130, and/or image storage device 140, may, via server 200, access one or more remote programs that, when executed, perform functions related to disclosed embodiments. Memory 230 may also store data that may reflect any type of information in any format that the system may use to perform operations consistent with the disclosed embodiments.

Server 200 may also be communicatively connected to one or more database(s) 240. For example, server 200 may be communicatively connected to database(s) 240 through network 150. Database 240 may include one or more memory devices that store information and are accessed and/or managed through server 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database(s) 240 and to provide data from database 240.

In an exemplary embodiment, server 200 may be configured to receive and/or store transaction data. Transaction data may be data associated with one or more financial transactions made by a customer. For example, a customer may visit a physical location associated with a merchant device 120 (e.g., a retail store) and make a purchase using a debit or credit card. The merchant device 120 may receive and/or generate transaction data associated with the purchase. Other examples of financial transactions may include, for example, one or more purchase transactions via an online merchant device 120 (e.g., online transactions involving a Web site provided by one or more servers associated with the merchant), one or more Automated Teller Machine (ATM) transactions (e.g., fund withdrawal, account status check, bill payment, deposit transaction, etc.), one or more financial service transactions that takes place at a physical location of associated with financial service provider device 130, such as, for example, a branch of a financial service provider (e.g., fund withdrawal, bill payment, deposit transaction, account status check, etc. at a branch location of a bank), one or more financial service transactions (e.g., fund withdrawal, bill payment, deposit transaction, account status check, etc.) involving an online banking system associated with financial service provider device 130 (e.g., a Web site that provides financial services for customers of the financial service provider), one or more transactions involving the use of a mobile application, such as for example, where client device 110 is a smart phone or tablet that executes a mobile application that allows the customer to perform one or more transactions (e.g., online banking transactions, merchant purchases, etc.), and the like.

In certain embodiments, merchant device 120 may transmit transaction data associated with financial transactions to financial service provider device 130 for storage and/or subsequent use. For example, a customer (e.g., user 112) may use a debit card associated with a financial account to transact with a merchant (e.g., make a purchase) and merchant device 120 (e.g., a point of sale device associated with the merchant) may communicate with financial service provider device 130 to verify and complete the purchase. Merchant device 120 may transmit transaction data to financial service provider device 130 during the communication.

In some embodiments, financial service provider device 130 may receive transaction information from an automated clearing house (ACH) device. An ACH device may be a computing device associated with an entity (e.g., clearing house) that processes transactions. The ACH device may receive information about transactions that occur between merchants and customers (e.g., from point of sale devices) and may perform processes to complete the transactions. For example, the ACH device may receive transaction descriptions from merchant devices associated with a debit card or credit card purchase at the merchant and communicate with financial service provider devices to complete the transactions (e.g., arrange for the transfer of funds) or otherwise notify financial service provider device 130 of the transaction. In the process, the ACH device may transmit transaction data to financial service provider device 130, which financial service provider device 130 may store.

In other embodiments, stored transaction data may include transaction data received by another component of system 100, such as client device 110. For example, a customer (e.g., user 112) may use client device 110 to transmit information regarding financial transactions that are unknown to financial service provider device 130 (e.g., cash transactions, transactions using financial accounts not associated with financial service provider 130, etc.). Similarly, merchant device 120, client device 110, and/or other components of system 100 may transmit additional information regarding transactions not typically included in transaction data received by financial service provider device 130 as part of authorizing the underlying transaction.

Transaction data may include information related to a particular aspect of the transaction. For example, transaction data may include time information relating to a time when the financial transaction was performed (e.g., when a purchase transaction was initiated, completed, or processed for payment, etc.); date information relating to a date when the financial transaction was performed (e.g., information reflecting the day, month, year, and/or day of week, etc.); fund amount information relating to a monetary amount involved in the financial transaction, such as, for example, the purchase amount for a purchase transaction, the deposit amount for a deposit transaction, a withdrawal amount for a withdrawal transaction, etc.; merchant or third party information relating to a transaction (e.g., brand name of the merchant); location information relating to the location of where the financial transaction occurred, such as, for example, geographic location information (e.g., city, state, country, zip code, latitude/longitude information, GPS coordinates, etc.) of a merchant where the customer performed a purchase transaction, a financial service provider location (e.g., bank branch), or the customer's location when performing an online financial transaction; customer identifying information (customer name, identification number, account number); or any other type of information associated with a financial transaction.

The configuration of system 100 described herein allows the components of system 100 to collect transaction data, which may be used to provide customers with financial services related to their financial activity.

Figure 3:
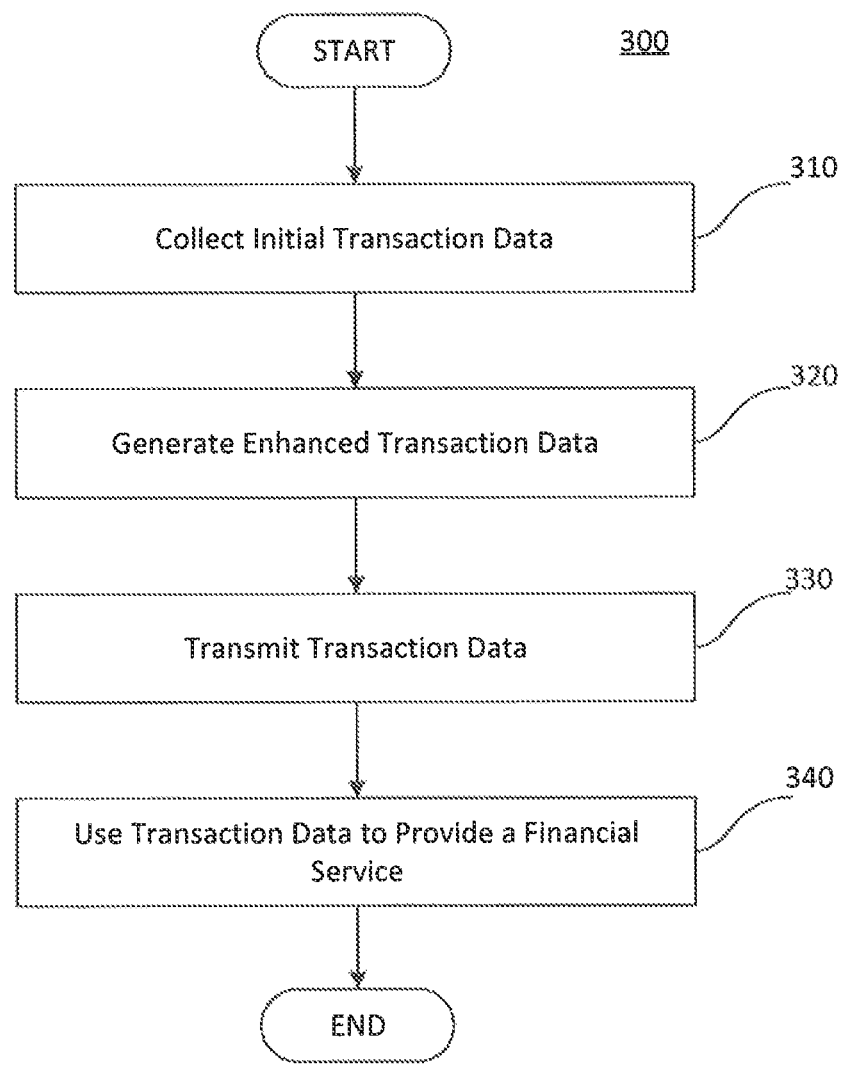
FIG. 3 is a flowchart of an exemplary process for providing transaction data for use in generating a visual representation, consistent with disclosed embodiments.

FIG. 3 illustrates an exemplary process 300, consistent with disclosed embodiments. In one embodiment, one or more of the components of system 100 may perform process 300 to provide transaction data for use in generating a visual representation of the data. A visual representation may allow customers to review their financial activity in an efficient and convenient manner.

Financial service provider device 130 may collect initial transaction data (step 310). As has been described, transaction data may be generated when a customer performs a transaction. For example, a customer may make a purchase at a retail store or restaurant. A merchant device 120 associated with the purchase may generate transaction data which includes information such as purchase time and date, merchant name, purchase amount, etc. This data may be considered initial transaction data. Merchant device 120 may transmit the initial transaction data to financial service provider device 130, such as to complete a credit or debit card transaction. In some instances, financial service provider device 130 may receive initial transaction data from other sources, such as client device 110, an ACH device, a user using an I/O device, etc.

A typical customer may perform several transactions throughout a given day and/or week, each of which may cause a corresponding merchant device 120 (or other device) to transmit initial transaction data to financial service provider device 130. For example, a customer may travel on a trip, using a debit or credit card to make payments along the way. Financial service provider device 130 may gather the initial transaction data associated with the transactions and store the data in association with the customer (e.g., in association with a customer financial account).

Financial service provider device 130 may process received initial transaction data to generate enhanced transaction data (step 320). Due to the wide range of potential financial transactions and associated parties to the transactions (e.g., different merchants, types of merchants, types of transactions, etc.), the initial transaction data associated with a particular transaction or set of transaction may be inconsistent across transactions. For example, initial transaction data associated with some transactions may include more pieces of information (e.g., merchant name, merchant location, SKU-level data, etc.) than others. Further, initial transaction data associated with some transactions may include non-useful information, such as alphanumeric strings that are only relevant to a merchant that generates them.

Financial service provider device 130 may include hardware and/or software components configured to receive initial transaction data associated with transactions and enhance the data such that the information associated with each transaction is more organized, comprehensive, and/or consistent across transactions. Financial service provider device 130 may parse transaction data and determine the transaction information that is present, as well as the transaction information that is missing. Financial service provider device 130 may extract the transaction information and index it according to categories of information. For example, financial service provider device 130 may determine that initial transaction data associated with a particular transaction includes information that could be categorized as merchant name, city location, the amount of the purchase, the time of the purchase, the date of the purchase, the identity of the customer, etc.

In addition, financial service provider device 130 may perform one or more processes to add transaction information not included with the initial transaction data. For example, financial service provider device 130 may be configured to determine a zip code associated with the merchant location indicated by another piece of information in the initial transaction data, such as the name of the city location of the merchant. In another example, financial service provider device 130 may generate a request for user input, which may be presented to and responded to by the user (e.g., user 112, an employee of a financial service provider, etc.) via client device 110, merchant device 120, financial service provider device 130, etc., in order to receive missing or additional transaction information. Financial service provider device 130 may also remove non-useful information from the transaction descriptions.

The processed initial transaction data may be stored as enhanced transaction data. The enhanced transaction data may be in a better condition compared to the initial transaction data for use in providing financial services. For example, it may be easier to generate visual representations of transaction data using enhanced transaction data, since transaction data associated with various transactions may be more organized (e.g., into categories of known information), comprehensive, and/or consistent (e.g., the same information is known for each transaction). It should be understood however, that step 320 may be omitted if initial transaction data is sufficient to provide a particular financial service, if the initial transaction data cannot be enhanced (e.g., all available data is provided with the initial transaction data), and/or if enhancing of initial transaction data is unavailable.

Returning to process 300, financial service provider device 130 may transmit transaction data to client device 110 (step 330). The transaction data may include enhanced transaction data and/or initial transaction data, depending on the data available. In some embodiments, client device 110 may be configured to enhance (or further enhance) initial transaction data. The transaction data may be associated with user 112. For example, the transaction data may be associated with financial transactions made by user 112. In an exemplary embodiment, the transaction data may include transaction information that includes at least a transaction amount (e.g., payment/purchase amount), transaction time and date, merchant name, card present/absent, and transaction/merchant location (e.g., city, state, and/or zip where transaction took place, which may correspond to a merchant location), although additional or alternative transaction information may be used.

In an exemplary embodiment, client device 110 may use the transaction data to provide a financial service to user 112 (step 340). Client device 110 may provide the customer service through an I/O device such as an interactive user interface. In some embodiments, the user interface may be associated with software program, such as a mobile application accessible on a mobile device. In an exemplary embodiment, client device 110 may use the transaction data to generate and display a visual representation of the data.

Figure 4:
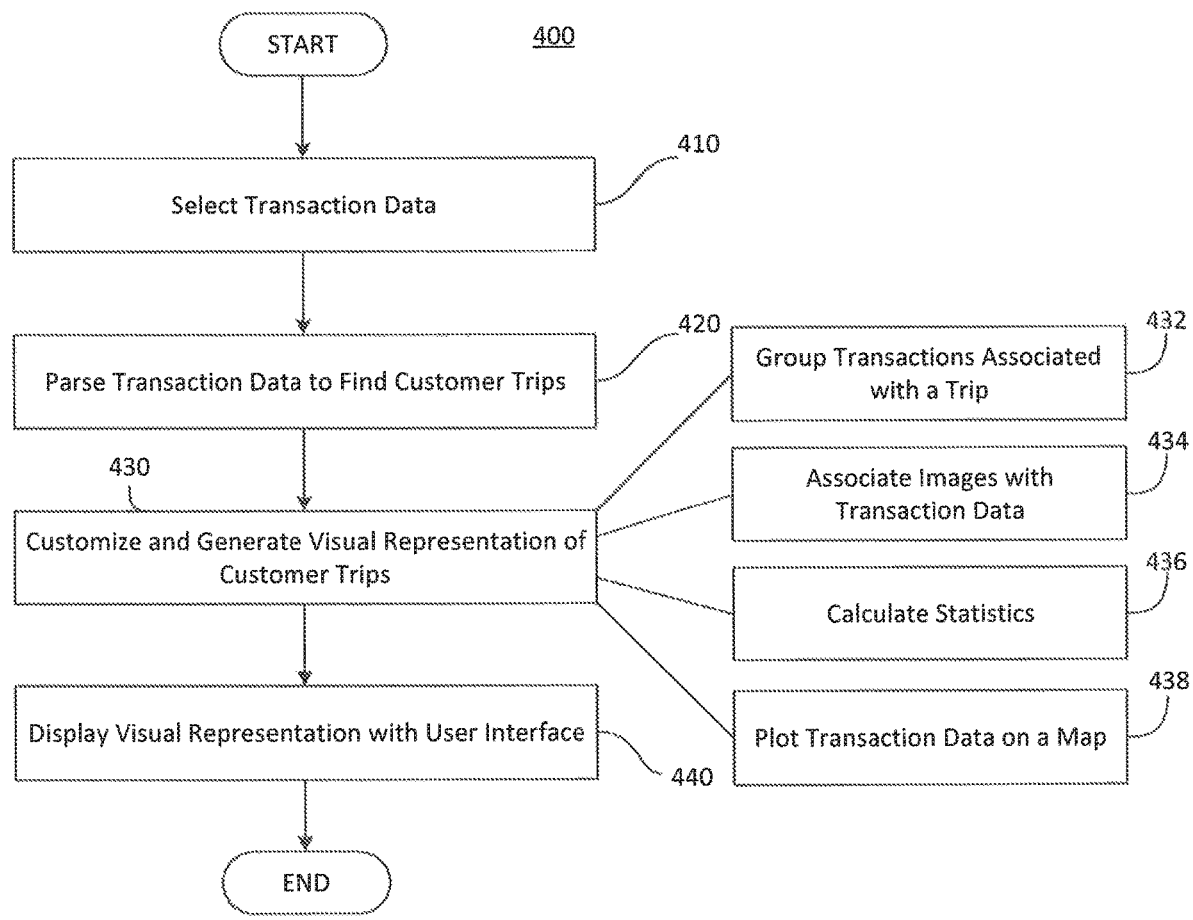
FIG. 4 is a flowchart of an exemplary process for providing a visual representation of transaction data, consistent with disclosed embodiments.

FIG. 4 depicts an exemplary process 400, consistent with disclosed embodiments. In an exemplary embodiment, financial service provider device 130 may perform process 400 to generate and display a visual representation of transaction data. Process 400 may include financial service provider device 130 selecting transaction data (step 410). In some embodiments, financial service provider device 130 may select transaction data in response to a received request, which may be from client device 110. Client device 110 may receive the request from another component of system 100 and/or user 112, for example.

In some embodiments, financial service provider device 130 may transmit selected transaction data to client device 110. In these embodiments, client device 110 may perform some or all of the processes described below (e.g., instead of financial service provider device 130).

In some embodiments, user 112 may operate client device 110 to request a particular service, which may be transmitted to financial service provider device 130 to indicate the transaction data that should be selected and/or transmitted back to client device 110. For example, client device 110 may request selection of transaction data associated with all transactions, all transactions associated with a particular financial account, all transactions within a given time period, etc. In some embodiments, client device 110 may transmit a request and/or receive transaction data over network 150, for example.

Financial service provider device 130 may process selected transaction data to determine data or sets of data that may be used in the visual representation. In an exemplary embodiment, financial service provider device 130 may parse the received transaction data to find transactions associated with customer trips (step 420). Customer trips may be defined by a set of transactions that take place while a customer is traveling away from their home area. For example, a customer trip may include a vacation, a business trip, a road trip, a move, a trip to visit friends or family, and/or similar trips in which the customer is away from areas in which they are normally located (e.g., home, work, school, etc.).

Financial service provider device 130 may identify customer trips by analyzing received transaction data to look for transaction information that indicates that a transaction occurred while the customer was on a trip. For example, financial service provider device 130 may analyze transaction information corresponding to transaction time and date and transaction location. Financial service provider device 130 may use transaction time and date information to determine a chronological order in which transactions took place. Financial service provider device 130 may use transaction location information to categorize transactions as either "home" or "away". In one example, home transactions may correspond to transactions that take place within the customer's home area. The customer's home area may be defined in any manner. For example, the customer's home area may be defined as the area including a specified radius around the customer's home address, an area corresponding to one or more zip codes near the user's home, the customer's home city or state, the customer's country, etc. Financial service provider device 130 may use the specified definition of "home" and determine whether transaction data indicates that an associated transaction should be categorized as home or away, where "away" transactions are any transactions that do not take place within the customer's home area.

In an exemplary embodiment, financial service provider device 130 may analyze the transaction data, which may be in chronological order and/or may be categorized as home or away, to find customer trips. For example, financial service provider device 130 may determine that a cluster of transactions that are each categorized as away and took place consecutively corresponds to a customer trip. In other words, for a chronological list of transactions, a customer trip may begin with the first transaction that is categorized as away and end with the last away transaction before a home transaction. In some embodiments, a minimum number of transactions may be necessary (e.g., 2, 3, 4, 5, etc.) for a cluster of transactions to be considered a customer trip. In some instances, financial service provider device 130 may determine that a customer may be currently on a trip, such as when the last transaction is an away transaction.

Financial service provider device 130 (and/or client device 110) may further process transaction data associated with a trip to customize and generate a visual representation of the trip (step 430). For example, financial service provider device 130 may use transaction data associated with all the transactions that took place during a trip to find, determine, calculate, and/or generate additional information that may be used in the visual representation. FIG. 4 further depicts exemplary steps that client device 110 may perform to customize a visual representation of a trip.

In step 432, financial service provider device 130 may categorize transactions associated with a trip into sub-groups of transactions. In one example, financial service provider device 130 may group transactions of a trip into various places that were visited during the trip (i.e., stops on the trip). For example, for a trip where the customer traveled to three different cities (completing transactions in each city), the transactions may be placed into groups corresponding to each city. Financial service provider device 130 may group the transactions using transaction location information found in the transaction data. In other examples, financial service provider device 130 may group transactions according to other categories, such as type of merchant (e.g., restaurant, gas station, entertainment, etc.), type of transaction, amount of transaction, card present/absent, financial account used for transaction, etc.

In step 434, financial service provider device 130 and/or client device 110 may associate images with the transaction data. For example, financial service provider device 130 and/or client device 110 may associate an image with each transaction that took place during the trip. Financial service provider device 130 and/or client device 110 may communicate with image storage device(s) 140 to find one or more images that correspond to individual transactions.

In a first example, client device 110 may take images from user 112's personal images, such as photographs that user 112 captured during the trip and stored in an image storage device 140 (e.g., memory) connected to client device 110. Client device 110 may match contextual information associated with an image to transaction data to determine that an image is associated with a transaction. For example, client device 110 may match time, date, and location transaction information with an image that includes time, date, and location contextual information that is approximately the same to find an image that corresponds to a transaction. For example, user 112 may take a photograph of his or her food at a restaurant. The time, date, and location associated with the photograph may approximately match the time, date, and location of a payment transaction with the restaurant. Client device 110 may associated the matched image with the transaction for use in the visual representation. Client device 110 may communicate with financial service provider device 130 to associate images stored on client device 110 with transaction data processed by financial service provider 130.

In a second example, financial service provider device 130 may use publically-available images, such as images available via network 150 (e.g., the Internet), or images otherwise available to user 112 (e.g., images stored on another client device, such as a home computer, or personal images stored in the cloud). For example, financial service provider device 130 may use an API to communicate with an image storage device 140 that stores various images (e.g., images of various locations, buildings, people, etc.) and is publically-available (e.g., Google Street View™ or Flickr™). Financial service provider device 130 may use transaction information such as location information and/or merchant name information to find a matching image. For example, financial service provider device 130 may find an image of a restaurant to associate with a transaction at that restaurant. In some aspects, financial service provider device 130 may use a publically-available image when no matching personal image is found.

In some embodiments, financial service provider device 130, client device 110, and/or another component of system 100, may leverage data (e.g., metadata) associated with stored images (e.g., images stored on client device 110 and/or available via network 150) to match an image to a transaction. Metadata may include, for example, geo-location (e.g., latitude and longitude) and time stamp information associated with an image (e.g., an image captured with a camera, such as a digital camera), which may be compared to the geo-location and time stamp metadata of a transaction (e.g., a credit card transaction). In some embodiments, the comparison may allow for some variation (e.g., matching geo-location and time stamp to within a certain degree of accuracy) due to potential inaccuracies (e.g., due to GPS limitations) and/or time periods and location gaps between when and where a transaction is recorded and a picture is captured.

In some embodiments, a component of system 100 (e.g., client device 110 and/or financial service provider device 130) may filter image and/or transaction metadata to allow for comparisons of like data. For example, client device 110 and/or financial service provider device 130 may filter image and/or transaction locations that are addresses to determine corresponding geo-locations for a comparison with other geo-locations.

In addition, in some embodiments, an iconic image captured at a nearby location (e.g., and image of a famous building or monument in a particular city) may be selected as a match for a particular transaction, such as when another image is not available.

In some embodiments, financial service provider device 130 and/or client device 110 may associate images with other aspects of the trip and/or individual transactions). For example, financial service provider device 130 may associate one or more images with each group of transactions found in step 432 (e.g., each city the customer visited), with transactions grouped according to other criteria, such as an evening out (e.g., Friday evening cab to dinner, dinner, a movie, and cab back home) or a particular activity (e.g., transactions associated with coffee purchases), and/or with the trip itself. In this way, financial service provider device 130 may provide additional context to transactions associated with a trip.

In step 436, financial service provider device 130 may use the transaction data associated with a trip to calculate statistics associated with the customer's financial activity while on the trip. For example, financial service provider device 130 may calculate a summary of total charges for the entire trip and total charges at each stop along the trip (e.g., each city visited). In another example, financial service provider device 130 may calculate totals for categories of transactions completed during the trip, such as total amount spent on food, gas, entertainment, etc. Financial service provider device 130 may use purchase amount transaction information found in the transaction data to calculate the totals and/or other statistics.

In step 438, financial service provider device 130 may identify transaction location information for each transaction such that the transactions may be plotted on a map. For example, financial service provider device may generate a map as part of a visual representation of a trip, such as a map that depicts the location of each city visited on a trip, a map of a visited city that includes locations of each transaction, a map that includes a path indicating the customer's travel throughout the trip, and/or the like.

After customization and generation of the visual representation, client device 110 may display the visual representation of one or more trips using a user interface (step 440). For example, client device 110 may display the visual representation on a screen connected to client device 110. In some embodiments, financial service provider device may transmit information to client device 110 for use in displaying the generated visual representation.

In some embodiments, user 112 may subsequently operate client device 110 to interact with the user interface and choose various aspects of the visual representation for display (e.g., statistics for the trip, individual transactions, a map of the transactions, etc.).

Figure 5:
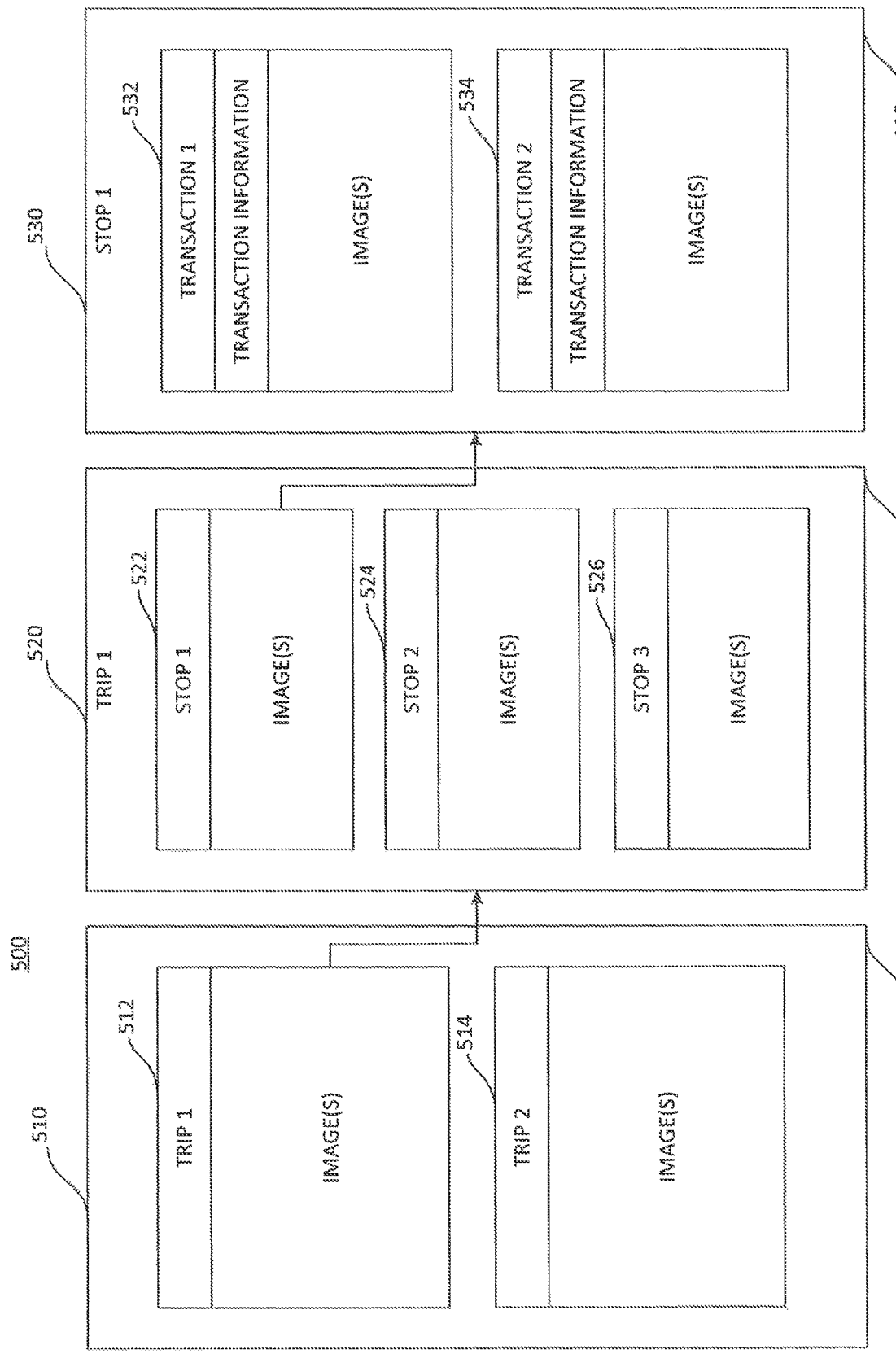
FIG. 5 is a schematic illustration of exemplary user interfaces, consistent with disclosed embodiments.

FIG. 5 depicts a schematic illustration of a set of exemplary user interfaces 500 on a client device 110, consistent with disclosed embodiments. User interfaces 500 may include various aspects of a generated visual representation of a customer's (e.g., user 112) financial activity. It should be understood, however, that user interfaces 500 are merely exemplary and that other arrangements and configurations may be used to provide a visual representation of a customer's financial activity.

In an exemplary embodiment, client device 110 may display user interfaces 500 to user 112. User 112 may operate client device 110 to interact with user interfaces 500, such as to switch between exemplary user interfaces 510, 520, and 530. User interface 510 may display a list of one or more customer trips, such as customer trips 512, 514. Customer trips 512, 514 may be trips made by the customer and that were determined from transaction data associated with transactions the customer made while on the trip. For example, customer trip 512 may be a vacation and customer trip 514 may be a business trip.

The display portions associated with each customer trip 512, and 514 may include information that identifies the trip, provides calculated statistics (e.g., amount spent on the trip), length of time of the trip, etc. As shown in FIG. 5, each display portion associated with customer trips 512, 514 may include one or more images related to the respective trip. For example, customer trips 512, 514 may each include a display of a photograph taken while on the trip, an image associated with the trip destination, a map of the destination or the path taken on the trip, a collage of images, etc. The image(s) may allow the customer (e.g., user 112) to quickly and easily identify the trip.

In an exemplary embodiment, client device 110 may be configured to receive input from user 112 to interact with user interface 510, such as to allow user 112 to select one of customer trips 512 or 514 (e.g., through a touch screen or mouse). If user 112 selects customer trip 512, client device 110 may perform one or more processes to display user interface 520. In an exemplary embodiment, user interface 520 may display a list of categorized sub-groups that were determined from the transaction data associated with customer trip 512. For example, as shown in FIG. 5, user interface 520 may display a list of destination stops 522, 524, 526 that the customer made while on customer trip 512. In an exemplary embodiment, stops 522, 524, 526 may correspond to cities that were visited during customer trip 512.

The display portions associated with each stop 522, 524, 526 may include information that identifies the stop (e.g., city name), provides calculated statistics (e.g., amount spent in that city), length of time spent at that stop, etc. Similar to customer trips 512, 514, the display portions associate with stops 522, 524, 526 may include one or more images related to the respective stop. For example, stops 522, 524, 526 may each include an image of a city skyline associated with each stop, a landmark associated with each stop, a personal photograph taken at each stop, a map of the city or the customer's travel path associated with each stop, etc. The image(s) may allow the customer (e.g., user 112) to easily differentiate between the stops (or other subcategories of transactions) that were made during the trip.

In an exemplary embodiment, client device 110 may be configured to receive additional input from user 112 to interact with user interface 520, such as to allow user 112 to select one of stops 522, 524, or 526. For example, user 112 may select stop 522, which may cause client device 110 to perform one or more processes to display user interface 530. User interface 530 may include a list of transactions 532, 534 that took place at stop 522. In some embodiments, user interface 520 may include an option that user 112 may select to cause client device 110 to display a list of all transactions made during the trip (e.g., at all stops).

Display portions associated with transactions 532, 534 may include transaction information associated with the respective transaction. For example, transaction amount, merchant name, transaction date and time, etc., may be displayed to the user for each transaction 532, 534. In addition, user interface 530 may display one or more images associated with a respective transaction 532, 534. For example, a photograph of the customer's food taken while he or she ate at a restaurant may be displayed in association with a restaurant transaction. Similarly, a photograph of the customer at an amusement park may be displayed in association with a transaction corresponding to the amusement park entry fee. In other instances, general images of a hotel, a store, a gas station, etc. or a brand logo may be displayed when personal images are not available.

In some embodiments, user interface 530 may be configured such that user 112 may operate client device 110 to interact with user interface 530. For example, client device 110 may receive input indicating that a user is selecting a particular transaction 532 or 534. Client device 110 may perform one or more processes to modify user interface 530 or generate another user interface that displays additional information, such as additional transaction information associated with the transaction, additional images (e.g., a map indicating a location of the transaction), and the like.

Figure 6:
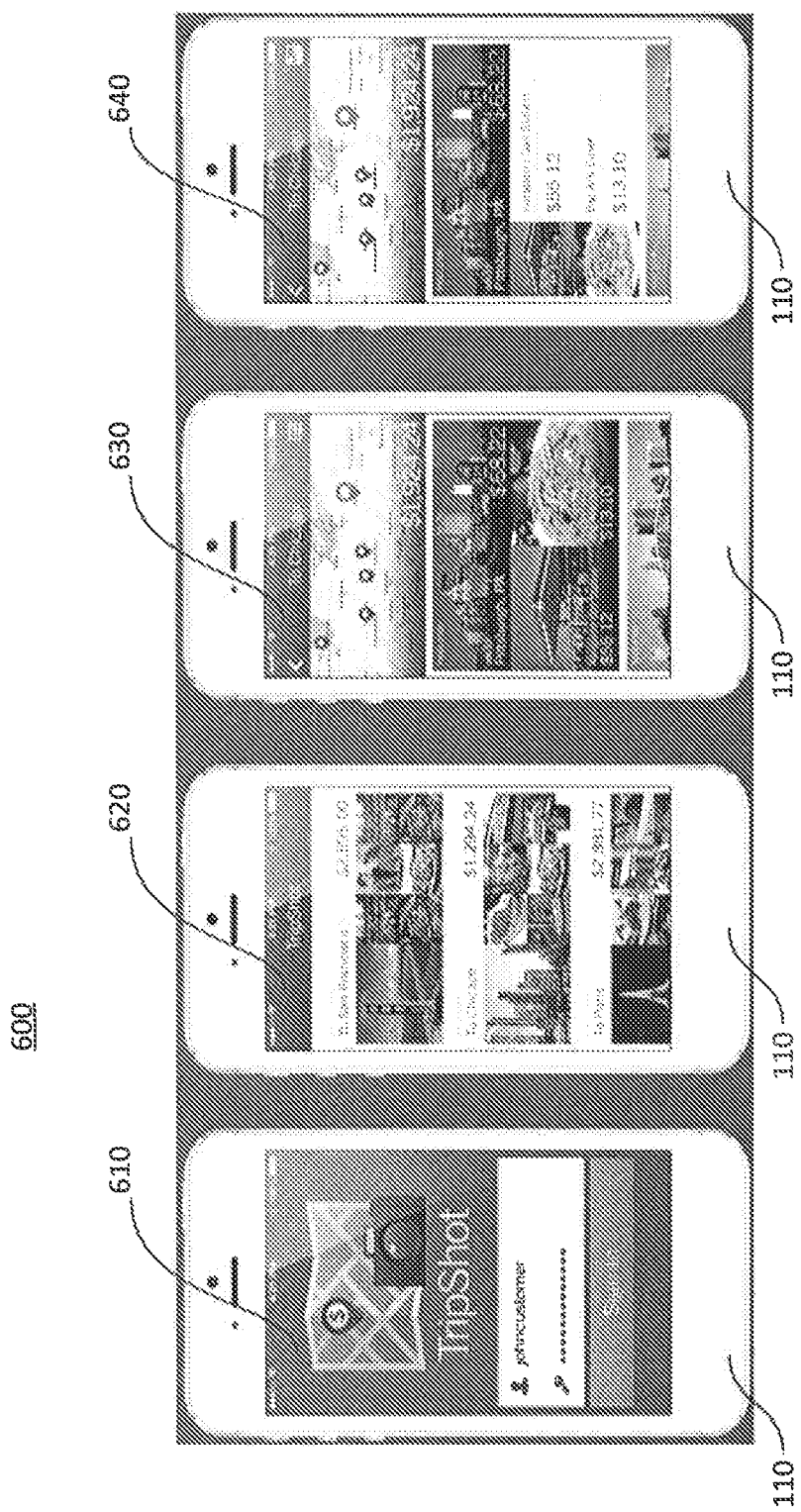
FIG. 6 is an illustration of exemplary user interfaces, consistent with disclosed embodiments.

FIG. 6 depicts a particular illustration of a set of user interfaces 600 on a client device 110, consistent with disclosed embodiments. In some embodiments, some or all of user interfaces 600 may be similar to user interfaces 500 of FIG. 5. In an exemplary embodiment, client device 110 may include one or more hardware and software components configured to generate user interfaces 600. For example, client device 110 may be a smartphone with a processor configured to execute a mobile application that may be used to generate user interfaces 600. User interfaces 600 may include user interfaces 610, 620, 630, 640.

User interface 610 may be a login interface that allows a customer (e.g., user 112) to login to their account, which may be associated with a financial service provider. In this way, the customer may be authenticated for viewing of financial activity.

User interface 620 may include a list of customer trips. For example, user interface 620 illustrates a trip "To San Francisco", "To Chicago", and "To Paris". As shown in FIG. 6, each customer trip may include a total amount spent while on each trip. In an exemplary embodiment, each customer trip may be selectable to cause client device 110 to display a corresponding user interface, such as user interface 630.

User interface 630 may display more specific information about a selected trip, such as the trip "To Chicago", as shown in FIG. 6. User interface 630 may display stops that were made during the customer trip, various images associated with the trip, transaction information, etc. In an exemplary embodiment, portions of user interface 630 may be selected to cause client device 110 to generate user interface 640, which may display additional information, such as more information about specific transactions made at a particular stop.

The exemplary disclosed embodiments provide a customer with a visual representation of their financial activity. The visual representation may be used by the customer to review financial transactions, statistical information related to those transactions, geographic information, among other things. In addition, association of images may personalize the representation and provide an easy and efficient means for the customer to recognize activity (financial and/or otherwise).

As described herein, customer trips may be groups of transactions that may be particularly useful for a visual representation. For example, the customer may use the visual representation as a record of the trip, allowing the customer to review what happened while on the trip, use the record for budgeting reasons, prepare an expense report, etc.

In addition, the visual representation may allow customers to easily and accurately identify fraudulent transactions. Similarly, the images and other contextual information allow the customer to easily recognize a transaction that they may not otherwise remember, reducing occurrences of customers mistakenly concluding that a charge is fraudulent.

The exemplary disclosed embodiments describe systems and methods for providing a visual representation of financial activity. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, Objective-C, Python, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM.

It is intended, therefore, that the specification and examples be considered as example only, with a true scope and spirit being indicated by the following claims and their full scope of equivalents.

What is claimed is:

1. A system for providing a visual representation of customer activity, comprising:
an image storage device storing:
images captured by a customer and non-captured images not captured or created by the customer; and
geo-location data associated with the captured and non-captured images;
one or more memory devices storing instructions; and
one or more processors executing the instructions to perform operations comprising:
receiving, over an electronic network, transaction data associated with transactions made by the customer, the transaction data containing geo-location data associated with the transactions;
enhancing the transaction data, the enhancing comprising:
extracting the transaction data, and
indexing the extracted transaction data according to categories of information;
determining a customer trip based on the enhanced transaction data;

comparing the enhanced transaction data of the customer trip with the geo-location data of the captured and non-captured images;
determining that a set of the captured and non-captured images correlate to the transaction data of the customer trip;
receiving a request for a visual representation of the customer trip;
categorizing, by the one or more processors, the transactions of the customer trip into sub-groups corresponding to stops made during the trip;
generating, based on the enhanced transaction data the requested visual representation of the customer trip, comprising:
images correlated with the transaction data of the customer trip;
information on the stops made during the customer trip; and
transaction activity associated with the stops; and
displaying the visual representation on a user interface of the client device.

2. The system of claim 1, wherein the customer trip includes consecutive transactions away from a home area of the customer.

3. The system of claim 2, wherein the consecutive transactions include each transaction that occurred after a first transaction in the home area and before a second transaction in the home area.

4. The system of claim 3, wherein the sub-groups include consecutive transactions.

5. The system of claim 1, wherein the sub-groups are associated with at least one of a city, a state, or a zip code.

6. The system of claim 1, wherein the one or more processors is further configured to search the image storage device for captured and non-captured images that relate to the transactions.

7. The system of claim 6, wherein searching for the captured and non-captured images that relate to the transactions further includes correlating time and date information associated with the transactions with time and date information associated with the captured and non-captured images.

8. The system of claim 6, wherein the image storage device is a server associated with a web-based image service.

9. The system of claim 6, wherein the one or more processors is further configured to associate one of the captured or non-captured images with the selected trip or one of the stops made during the selected trip.

10. The system of claim 1, wherein the visual representation further includes a map depicting a location associated with each of the transactions made during the selected trip.

11. A computer-implemented method for providing a visual representation of customer activity, the method comprising:
storing images captured by a customer and non-captured images not captured or created by the customer and geo-location data associated with the captured and non-captured images in an image storage device; and
storing instructions in one or more memory devices and executing the instructions via one or more processors, the instructions comprising:
receiving, over an electronic network, transaction data associated with transactions made by the customer, the transaction data containing geo-location data associated with the transactions;
enhancing the transaction data, the enhancing comprising:
extracting the transaction data, and
indexing the extracted transaction data according to categories of information;
determining a customer trip based on the enhanced transaction data;
comparing the transaction data of the customer trip with the geo-location data of the captured and non-captured images;
determining that a set of the captured images correlate to the transaction data of the customer trip;
receiving a request for a visual representation of the customer trip;
categorizing, by the one or more processors, the transactions of the customer trip into sub-groups corresponding to stops made during the trip;
generating, based on the enhanced transaction data the requested visual representation of the customer trip, comprising:
images correlated with the transaction data of the customer trip;
information on the stops made during the customer trip; and
transaction activity associated with the stops; and
displaying the visual representation on a user interface of the client device.

12. The computer-implemented method of claim 11, wherein the customer trip includes consecutive transactions away from a home area of the customer.

13. The computer-implemented method of claim 12, wherein the consecutive transactions include each transaction that occurred after a first transaction in the home area and before a second transaction in the home area.

14. The computer-implemented method of claim 13, wherein the home area is defined as an area encompassing a specified radius around a home address.

15. The computer-implemented method of claim 11, further comprising searching the image storage device for captured and non-captured images that relate to the transactions.

16. The computer-implemented method of claim 15, wherein the images matched with the transactions are publicly-available images associated with merchants at which the transactions took place.

17. The computer-implemented method of claim 11, wherein the visual representation further includes a map depicting locations associated with each of the transactions made during the customer trip.

18. A non-transitory computer-readable medium comprising:
storing images captured by a customer and non-captured images not captured or created by the customer and geo-location data associated with the captured and non-captured images in an image storage device; and
storing instructions in one or more memory devices and executing the instructions via one or more processors, the instructions comprising:
receiving, over an electronic network, transaction data associated with transactions made by the customer, the transaction data containing geo-location data associated with the transactions;
enhancing the transaction data, the enhancing comprising:
extracting the transaction data, and indexing the extracted transaction data according to categories of information;

determining a customer trip based on the enhanced transaction data;

comparing the transaction data of the customer trip with the geo-location data of the captured and non-captured images;

determining that a set of the captured and non-captured images correlate to the transaction data of the customer trip;

receiving a request for a visual representation of the customer trip;

categorizing, by the one or more processors, the transactions of the customer trip into sub-groups corresponding to stops made during the trip;

generating, based on the enhanced transaction data the requested visual representation of the customer trip, comprising:

images correlated with the transaction data of the customer trio;

information on the stops made during the customer trip; and transaction activity associated with the stops; and displaying the visual representation on a user interface of the client device.

19. The system of claim 1, further comprising parsing the enhanced transaction data to identify missing transaction data.

20. The computer-implemented method of claim 11, further comprising parsing the enhanced transaction data to identify missing transaction data.

21. The system of claim 1, wherein the images stored by the image storage device include those associated with a web-based image service.

22. The system of claim 21, wherein the stored images associated with the web-based image service are associated with contextual information identifying at least one of a person, place, or thing contained in the stored images.

* * * * *

UNITED STATES PATENT AND TRADEMARK OFFICE
CERTIFICATE OF CORRECTION

PATENT NO. : 10,685,406 B1  
APPLICATION NO. : 14/632294  
DATED : June 16, 2020  
INVENTOR(S) : Alex Niderberg et al.

It is certified that error appears in the above-identified patent and that said Letters Patent is hereby corrected as shown below:

In the Claims

Claim 18, Column 19, Lines 19-20, "images correlated with the transaction data of the customer trio" should read --images correlated with the transaction data of the customer trip--.

Signed and Sealed this  
Twenty-eighth Day of July, 2020

Andrei Iancu  
*Director of the United States Patent and Trademark Office*